US011356365B2

(12) United States Patent
Maallem et al.

(10) Patent No.: US 11,356,365 B2
(45) Date of Patent: Jun. 7, 2022

(54) OPTIMIZED OBJECTIVE FUNCTION FOR ROUTING DETERMINATION

(71) Applicant: Itron Global SARL, Liberty Lake, WA (US)

(72) Inventors: Khalid Maallem, Issy les Moulineaux (FR); Jerome Bartier, Edinburgh (GB); Yacine Khaled, Meudon (FR); Meriem Mahjoub, Vélizy-Villacoublay (FR)

(73) Assignee: Itron Global SARL, Liberty Lake, WA (US)

( * ) Notice: Subject to any disclaimer, the term of this patent is extended or adjusted under 35 U.S.C. 154(b) by 100 days.

(21) Appl. No.: 16/868,418

(22) Filed: May 6, 2020

(65) Prior Publication Data

US 2021/0352008 A1    Nov. 11, 2021

(51) Int. Cl.
*H04L 45/02*    (2022.01)
*H04W 84/18*    (2009.01)
*H04L 45/48*    (2022.01)
*H04L 45/74*    (2022.01)
*H04W 40/02*    (2009.01)

(52) U.S. Cl.
CPC ............. *H04L 45/48* (2013.01); *H04L 45/02* (2013.01); *H04L 45/74* (2013.01); *H04W 40/02* (2013.01); *H04W 84/18* (2013.01)

(58) Field of Classification Search
CPC ......... H04L 45/48; H04L 45/02; H04L 45/74; H04W 40/02; H04W 84/18
See application file for complete search history.

(56) References Cited

U.S. PATENT DOCUMENTS

| 2012/0155475 | A1* | 6/2012 | Vasseur | ............... | H04W 40/248 |
| | | | | | 370/400 |
| 2013/0028143 | A1 | 1/2013 | Vasseur | | |
| 2019/0394737 | A1 | 12/2019 | Luo | | |

OTHER PUBLICATIONS

Gnawali et al. "The Minimum Rank with Hysteresis Objective Function", Internet Engineering Task Force (IETF), Request for Comments: 6719, Category: Standards Track; ISSN: 2070-1721, Sep. 2012 (Year: 2012).*
Winter, et al. "RPL: IPv6 Routing Protocol for Low-Power and Lossy Networks", Internet Engineering Task Force (IETF), Request for Comments: 6550, Category: Standards Track, ISSN: 2070-1721, Mar. 2012 (Year: 2012).*
The Extended European Search Report dated Sep. 24, 2021 for European Patent Application No. 21165517.0, 9 pages.

* cited by examiner

*Primary Examiner* — Joseph A Bednash
(74) *Attorney, Agent, or Firm* — Lee & Hayes, P.C.

(57) ABSTRACT

Techniques are directed to determining a rank value associated with a first network node. An example method includes determining a second network node indicated as being a preferred parent network node for the first network node. A first rank value is processed to determine a second rank value, the first rank value corresponding to a path from the second network node to a destination network node, including rounding up the first rank value in a predetermined manner to at least a second next higher integral rank value than the first rank value, to determine the second rank value. The second rank value is processed with at least a third rank value to determine the rank value associated with the first network node, the third rank value associated with a path from one of a plurality of candidate parent network nodes, for the first network node, to the destination network node.

20 Claims, 5 Drawing Sheets

OPTIMIZED OBJECTIVE FUNCTION FOR ROUTING DETERMINATION

BACKGROUND

Communication networks, such as wireless mesh networks and other types of networks, connect a variety of different devices that form a network. The different devices are known as network nodes. Network nodes in a communication network are often configured such that network traffic from network nodes in the communication network may be communicated through other network nodes along a path through the communication network, to a root network node or other destination network node.

Routing determination is a process of determining a path (such as an optimal path) through the network nodes for the network traffic. A routing determination may include applying one or more Objective Functions to one or more network nodes based on a Rank value associated with each of the one or more network nodes. An Objective Function is a function that is meant to maximize or minimize a numerical value, such as a Rank value. A Rank of a network node is an abstract numeric value that is an expression of a relative position of the network node within a network configuration, with regard to other network nodes including neighboring network nodes. (Note that "Rank" and "Objective Function" are capitalized herein. These are terms that are utilized in various requests for comments (RFCs), as discussed later.)

The Rank of a particular network node may be based on or otherwise related to the Ranks of the neighboring network nodes and/or to characteristics of the links between the particular network node and its neighboring network nodes. The characteristics of the links may be exhibited, for example, by metrics determined based on observing communications over the links. A particular network node may, for example, set its own Rank using a process such as is described in Section 3.3 of RFC 6719, "The Minimum Rank with Hysteresis Objective Function," March 2012. The Minimum Rank with Hysteresis Objective Function is known by its shortened name—MRHOF.

For example, the particular network node may have determined a preferred parent network node that the particular network node uses for relaying of communications between the particular network node and a destination network node, such as a root node of the network or of a portion of the network. There may also be a set of network nodes that is a set of candidate parent network nodes, where each candidate network node is a possibility for relaying communications between the particular network node and the destination network node based on a subsequent Rank and routing determination.

In some scenarios, even a slight increase in communication metric for communication between the particular network node and the preferred parent network node for the particular network node may result in an increase in Rank for the particular network node. This may occur even if the slight increase in communication metric is merely transient. In some scenarios, this slight increase in communication metric, because it results in increasing the Rank value advertised by the particular network node, may further result in poisoning routes for children network nodes of the particular network node, that utilize the particular network node to reach the destination network node. An example of poisoning is described at Section 8.2.2.5 of RFC 6550, "RPL: IPv6 Routing Protocol for Low-Power and Lossy Networks," March 2012.

In these scenarios, the Rank of the particular network node may change frequently. This may result in routes for the children network nodes, using the particular network node to relay communications with the destination network node, being frequently poisoned. This is even though communication through the particular network node may still provide a satisfactory route to the destination network node and, in some cases, the only satisfactory route to the destination network node.

A route that is poisoned for this or other reasons may, as a result of a subsequent Rank and routing determination, be quickly reestablished, only to be poisoned again, and so on. Route establishment may utilize a lot of network resources, including overhead for route establishment messaging between network nodes. The route establishment overhead can itself interfere with, or even overwhelm, regular network communications and/or other processing. It may be desirable to minimize poisoning of routes, including to limit such overhead.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

As discussed above, some critical routing determination scenarios using Objective Functions are prone to causing or contributing to network instability. The process of reestablishing a route to a destination network node may utilize handshake or other connectivity-establishing messaging, as well as processing by the network nodes themselves. Such messaging and processing may be minimized or avoided if the network instability can be minimized or eliminated.

This disclosure describes techniques directed to Rank determination in a manner that may address network instability issues. In one example method, a Rank value associated with a first network node is determined. The example method may include determining a second network node that is indicated as being a preferred parent network node for the first network node. The method may further include processing a first Rank value to determine a second Rank value, the first Rank value corresponding to a path from the second network node to a destination network node, the processing including rounding up the first Rank value in a predetermined manner to at least a second next higher integral Rank value than the first Rank value, to determine the second Rank value. The method may further include processing the second Rank value along with at least a third Rank value to determine the Rank value associated with the first network node, the third Rank value associated with a path from one of a plurality of candidate parent network nodes, for the first network node, to the destination network node.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein are applicable to any communications network, control network, and/or another type of network or system. In one example, the techniques may be implemented in the context of the Internet of Things (IoT).

Example Environment

Figure 1:
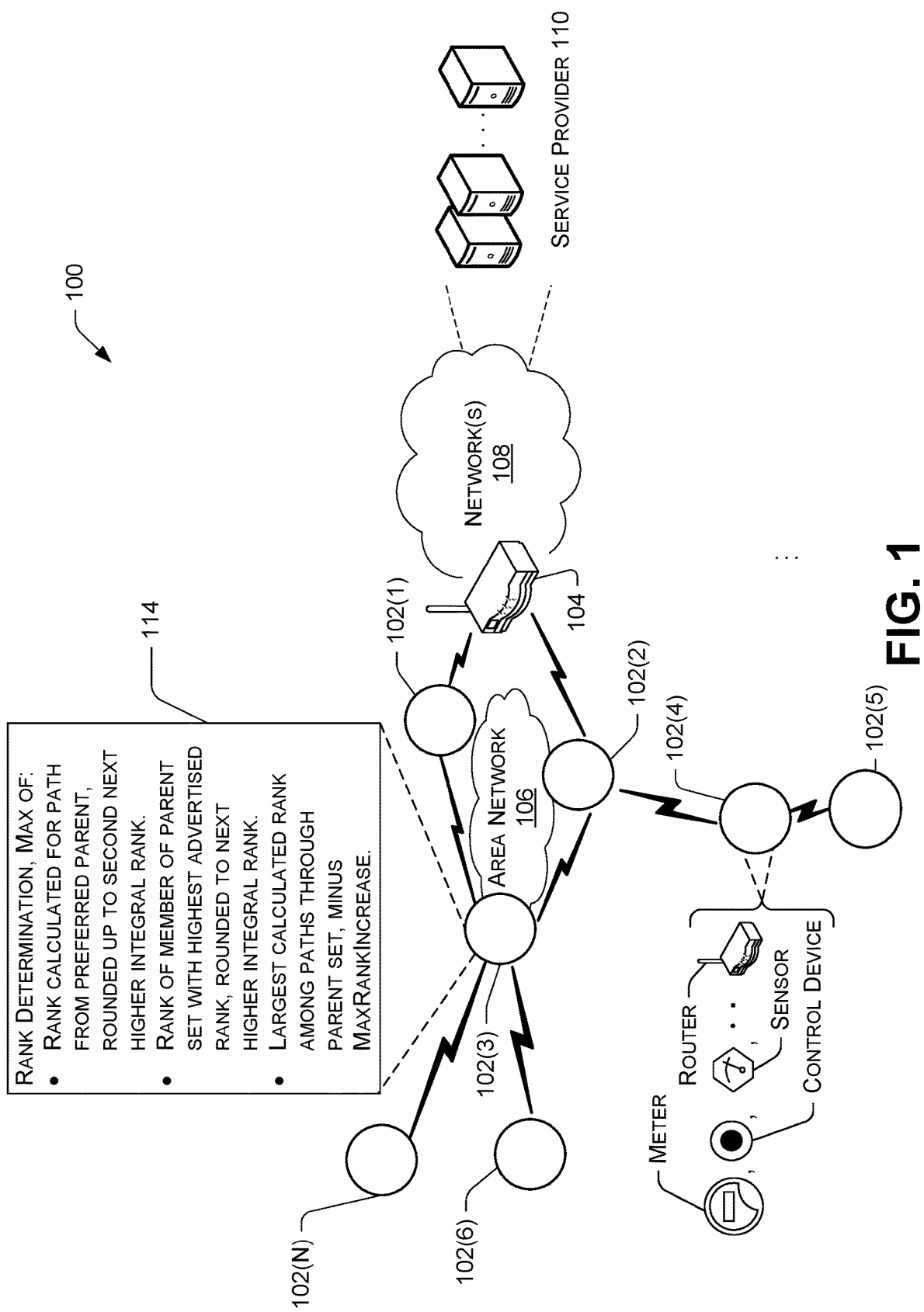
FIG. 1 is a schematic diagram of an example network architecture.

FIG. 1 is a diagram illustrating an example networked environment or architecture 100. The architecture 100 includes multiple network communication devices 102(1)-102(N) (collectively referred to as "network communication devices 102") and a network communication device 104, where N is any integer greater than or equal to 1. The network communication devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108. The network communication device 104 may be considered, for example, a root node of the AN 106. For at least some purposes, the network communication device 104 may be considered a destination network node (at least an intermediate destination) for communications from the network communications devices 102.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data throughout the AN 106. Alternatively, or additionally, the AN 106 may comprise a star network, in which a central device acts as a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data.

The service provider 110 may be physically located in a single central location, or it may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the network communication devices 102, the network communication device 104, and/or the service provider 110 may communicate according to various modulation schemes that are available to it and perform processing to determine and indicate a preferred link to use for communication. Available modulation schemes may differ by modulation type and/or by data rate.

For instance, the network communication device 102(3) may transmit and/or receive one or more communications/transmissions (e.g., Protocol Data Units (PDUs), such as bits, frames, packets, segments, etc.) with the network communication device 102(1) and/or 102(2) and, based on the metric data about the communications, determine a preferred link to use. The network communication device 102(3) may maintain, at 114, Rank data for other communication devices 102 that are available as a "parent" communication device to the network communication device 102(3) for relaying communications between the network communication device 102(3) and a particular destination network node such as the network communication device 104. Further, the network communication device 102(3) or some other device may update its Rank value at 114 and advertise the Rank value to other network communication devices 102, typically to neighboring network communication devices. The network communication devices 102 that receive the Rank value may utilize the Rank value to determine another network communication device to utilize to relay communications to a destination network communication device. In some examples, the Rank data at 114 may be determined based on Rank values for a plurality of candidate network devices in a candidate set of parent network nodes for the communication device 102(3) and/or a path from the communication device 102(3) to the destination communication device, through one of the plurality of candidate network devices.

Communication metric data may include a detected/measured value, a computed value, or any other statistic, metric, or value related to communication. For example, communication metric data may indicate a number of transmission attempts (e.g., a number of transmissions sent), a number of successful transmissions (e.g., a number of transmissions that are acknowledged by a receiving node), a number of unsuccessful transmissions (e.g., calculated by subtracting a number of transmission attempts by a number of acknowledgements), and so on. Further, in some examples communication metric data includes an Expected Transmission Count (ETX) metric and/or an Expected Transmission Time (ETT) metric, as discussed in further detail below.

In many instances, communication metric data may include data that is specific to a particular modulation scheme and/or to a particular link (e.g., direct communication path between devices). To illustrate, communication metric data may indicate a number of successful transmissions and a number of transmission attempts via a particular link (between a first node and a second node) with a particular modulation scheme.

An ETX metric may generally indicate an expected number of transmissions required to successfully send a transmission to a device. The ETX metric may be computed in a variety of manners. In one example, an ETX metric equals a total number of transmissions sent (e.g., transmission attempts) over a number of successful transmissions (e.g., transmissions acknowledged). In another example, an ETX metric equals 1/P, where P=Pf× Pr. Here, Pf corresponds to a probability that a transmission successfully arrives at a recipient, and Pr corresponds to a probability that an acknowledgment transmission is successfully received by a sender. Pf and Pr may be calculated according to the following formulas:

$$Pf = \frac{\text{Number of transmissions}(e.g., \text{probes})\ \text{received by a neighbor}(e.g., \text{recipient})}{\text{Number of transmissions}(e.g., \text{probes})\ \text{sent by a sender}}$$

$$Pr = \frac{\text{Number of transmissions}(e.g., \text{probes})\ \text{received by a sender}(e.g., \text{recipient})}{\text{Number of transmissions}(e.g., \text{probes})\ \text{sent by a neighbor}(e.g., \text{recipient})}$$

In some instances, such as where Pf and Pr cannot be computed separately (e.g., when the sender does not know the number of transmissions that a receiver sent to it), then the ETX metric may be estimated as in the first example above. That is, if Pf and Pr cannot be computed separately due to a lack of information, the ETX metric may correspond to a total number of transmissions sent over a number of successful transmissions.

An ETT metric may generally indicate an expected time required to successfully send a transmission to a device. In one example, the ETT metric equals a time to transmit a transmission of a given size multiplied by the ETX metric.

Communication metric data may be used in a variety of manners. In some instances, communication metric data is used to determine one or more Rank values. For example, a network communication device or other device may determine a Rank value based on ETX metrics for multiple modulation schemes that are available for the link. In particular, if a first modulation scheme that is supported by two network communication devices is associated with a lower ETX metric than a second modulation scheme that is also supported by the two network communication devices, the first modulation scheme may be selected.

Example Network Communication Device

Figure 2:
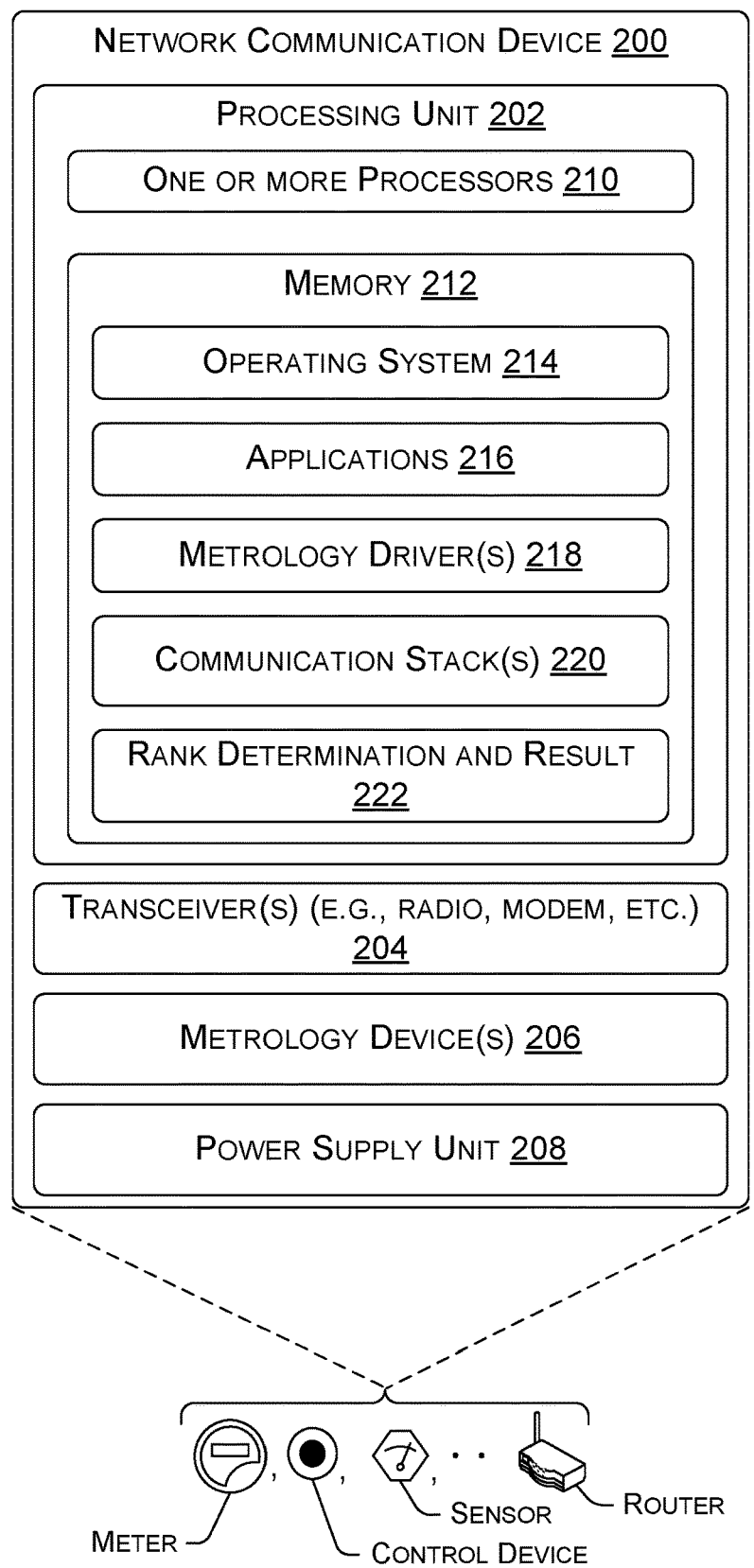
FIG. 2 is a diagram showing details of an example network communication device.

FIG. 2 is a diagram showing details of an example network communication device 200, such as any of the network communication devices 102 or the network communication device 104. The network communication device 200 may comprise any type of network communication device (sometimes referred to as a node, network node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, computer system(s) in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 may comprise a Full Function Device (FFD), while in other instances the network communication device 200 may comprise a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 may comprise physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as an FFD, the power supply unit 208 comprises a mains power connector that couples to an Alternating Current (AC) or Direct Current (DC) mains power line where the network communication device 200 is installed. In other instances, such as when the network communication device 200 is implemented as an LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 may include an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also include a portion 222 storing program instructions that, when executed by the one or more processors 210, determines Rank values for the network communication device 200. The portion 222 of the memory 212 may also store the resulting determined Rank values, with the Rank values being updated from time to time.

The memory 212 of the network communication device 200 may include software functionality configured as one or more "modules." The modules are intended to represent example divisions of software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Example Processes

Figure 3:
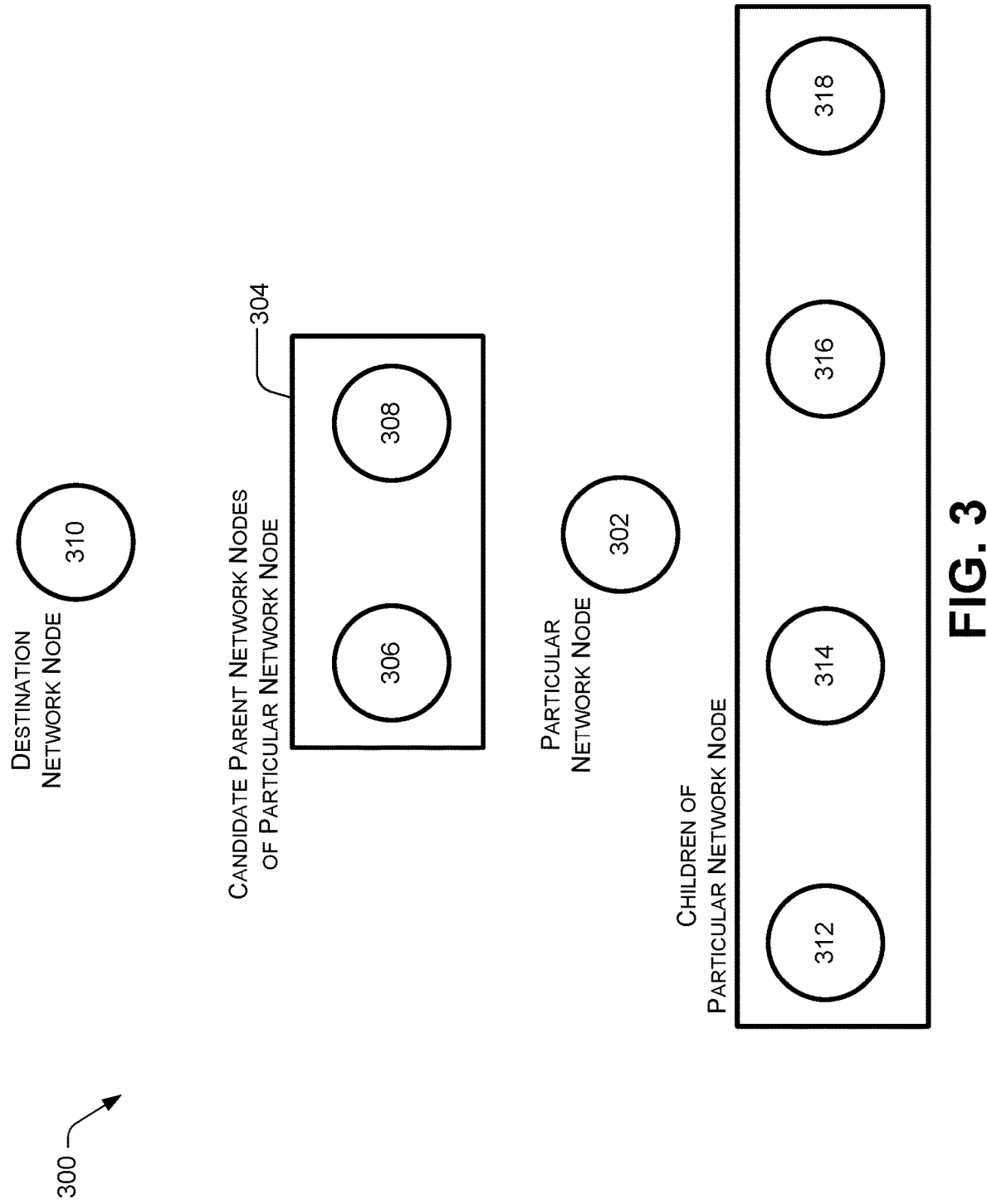
FIG. 3 is a diagram illustrating a portion of an Area Network, and is used to illustrate a process of Rank determination for a particular network node.

FIG. 3 is a diagram illustrating a portion 300 of an AN, such as the AN 106 in FIG. 1. The FIG. 3 diagram is used to illustrate a process of Rank determination for a network node 302 that may be, for example, one of the network devices 102 of the AN 106 in FIG. 1.

Rank may be thought of as a fixed-point number, where the position of the radix point between the integer part and the fractional part of the fixed-point number is determined by a parameter known as MinHopRankIncrease. See, e.g., RFC 6550. MinHopRankIncrease is the minimum increase in Rank between a network node and any of its candidate parent network nodes. When an Objective Function computes Rank, the Objective Function operates on the entire (e.g., 16-bit) Rank quantity, including both the integer part and the fractional part. However, in some examples, when Rank is compared for determination of parent relationships, only the integer part of the Rank quantity is used.

An advertised Rank value for a particular network node may comprise a metric for communication between the particular network node and a destination network node. The metric may be, for example, an approximation of an expected transmission count (ETX) as described in Section 3.4 of RFC 6719.

Referring to FIG. 3, a subset 304 of the network nodes includes a network node 306 and a network node 308. In the FIG. 3 example, the subset 304 of the network nodes has been determined in some manner, such as by observing and or otherwise obtaining metrics about communication between the network nodes of the subset 304 and a destination network node 310, to be the candidate parent network nodes for the particular network node 302. For example, the network nodes of the subset 304 of network nodes may be candidates to relay communications between the particular network node 302 and the destination network node 310, such as in part directly linking to the particular network node 302.

As discussed above, MRHOF is designed to find the paths with the smallest path cost to a destination network node. See, e.g., Section 3 of RFC 6719. It does this while also attempting to minimize excessive "chum" in the network. Conceptually, the MRHOF uses two mechanisms. First, it finds the candidate parent network node with a minimum path cost to the destination network node, which is the candidate parent network node with the minimum Rank. Second, it switches to that minimum Rank candidate parent network node, from a previously-preferred parent network node, only if the minimum Rank path is shorter (in terms of path cost) than the current path by at least a given threshold—referred to in RFC 6719 as "PARENT_SWITCH_THRESHOLD." This second mechanism is called "hysteresis."

As discussed above, there are some situations in which a route may be poisoned such that the preferred parent network node is no longer used. For example, a particular network node, as a preferred parent network node for various of its children network nodes, may poison routes for its children network nodes if the Rank of the particular network node is increased. This may force the children network nodes of the particular network node to reestablish a route to communicate with the destination network node. For example, referring to FIG. 3, the particular network node 302 may be a preferred parent network node for the network node 312, the network node 314, the network node 316 and the network node 318. If the Rank of the particular network node 302 is increased, then the particular network node 302 may poison the route to the destination network node 310 from the network node 312, the network node 314, the network node 316 and the network node 318, through the particular network node 302.

Turning now specifically to the MRHOF process for Rank setting process, described at Section 3.3 of RFC 6719, this process describes that the Rank for a particular network node (such as the particular network node 302) is set as the maximum of:

1. The Rank calculated for the path through the preferred parent.
2. The Rank of the member of the parent set with the highest advertised Rank, rounded to the next higher integral Rank.
3. The largest calculated Rank among paths through the parent set, minus MaxRankIncrease.

For item 1, the "path through the preferred parent" is the path from the particular network node, through the preferred parent, and to the destination network node. With continued reference to the FIG. 3 example network 300, the "path through the preferred parent" for Item 1 may be the path from the particular network node 302 to the destination network node 310, through the one of the network nodes in the subset 304 that is the preferred parent network node of the particular network node 302. For item 2, the parent set may be the subset 304. For item 3, in some examples, MaxRankIncrease is set to zero.

It should be noted that, according to Section 3.3 of RFC 6719, a network node's advertised Rank is set to the Rank of the preferred parent, plus the value of a MinHopRankIncrease parameter, if the resulting value is higher than the value determined using the items 1 to 3 described above. In some examples, the MinHopRankIncrease value is set to one for the integral part of the Rank. For example, a Rank value may be two bytes, with the least significant byte being the fractional part of the Rank value and the most significant byte being the integral part of the Rank value. In such examples, where the MinHopRankIncrease value is set to integral one, the MinHopRankIncrease value is 0x0100.

As discussed above, in some examples, an increase in the link cost between a particular network node and the preferred parent network node of the particular network node may cause the advertised Rank value for the particular network node to be increased. In some examples, increasing the advertised Rank value for a particular network node may cause the particular network node to poison the routes through the particular network node used by children of the particular network node. This may happen even in situations where the increase in the link cost between the particular network node and its preferred parent network node is small.

In some examples, however, a modification to Item 1 may be utilized. With the modification to Item 1, increases in the link cost between the particular network node and its preferred parent network node may be better tolerated with respect to routing. That is, with the modification to Item 1, the smaller increases in the link cost may not cause the advertised Rank value for the particular network node to be increased. As a result, the particular network node may not poison the routes through the particular network node used by children of the particular network node. In some examples, the particular network node may be the only possible parent node for children of the particular network node. Poisoning the route through the particular network node for children of the particular network node, in this situation, would result in the children having to reestablish a route through the particular network node.

In one example, Item 1 is modified to be "The Rank of the preferred parent, rounded up to the second higher integral Rank." The amount of rounding in the modified Item 1 is an example, and other amounts of rounding up are possible. With this modification to Item 1, the link cost between the particular network node and its preferred parent network node is no longer a consideration in determining the value for Item 1. Item 2, however, rounds up to only the first higher integral Rank as specified by RFC 6179. By not considering the link cost from the particular network node to its preferred parent network node in Item 1, this may minimize the situations in which the advertised Rank value of the particular network node increases. This thus may minimize the situations in which routes from the children of the particular network node, using the particular network node, are poisoned.

This may be useful for situations, for example, in which the particular network node is the only candidate parent network node for the children of the particular network node, minimizing the poisoning/reestablishing cycle discussed above. This also may be useful in situations in which the particular network node is one of several candidate parent network nodes, since the link cost to a candidate parent network node would have to go up substantially before Item 3, which considers the link cost, would overwhelm the Rank value determination for the particular network node using Item 1 and Item 2. Furthermore, in some situations, the Rank value for a particular candidate network node may be determined based on Item 2 being the maximum determined Rank value, in which case there will be no difference between the Rank value determined using Item 1 of the MRHOF and the modified Item 1.

Two examples using the modified Item 1 are now discussed, using hexadecimal notation for all the values used and determined in the examples. In the examples, the Rank value calculation using Items 1 and 2 is illustrated, showing a first Rank value calculation and a subsequent Rank value calculation. Both the first and subsequent Rank value calculations are illustrated using the MHROF as described in Section 3.3 of RFC 6179 and using a modification to Item 1 of the MRHOF, as discussed above. As discussed above, the modification to Item 1 is such that the Rank value of the preferred parent is rounded up to the second higher integral Rank. It should be recalled that, in any event, the Rank value determined for a particular network node is at least MinHopRankIncrease greater than the Rank value for any candidate parent network node. In the two examples, MinHopRankIncrease is assumed to be 0x0100.

In Example 1, a particular network node has only one candidate parent (P1), which is the preferred parent network node. The first Rank value calculation for the particular network node results in an advertised Rank value of 0x0400.

Example 1

| | | | | Standard MRHOF | MRHOF modified |
|---|---|---|---|---|---|
| | Parent List | | Rank via | Rank Rounded to the next | Rank of preferred parent rounded to the second next |
| Parent | Rank (advertised) | ETX (to parent) | preferred parent | Higher integral rank | Higher integral rank |
| P1 | 0x020A | 0x012C | 0x0336 | 0x0300 | 0x0400 |

For the subsequent Rank value calculation, the ETX to the preferred parent node network node increases only by one, from 0x012C to 0x012D.

| P1 | 0x020A | 0x012D | 0x0337 | 0x300 | 0x0400 |
|---|---|---|---|---|---|

As can be seen, using the MRHOF as modified, the result of the subsequent Rank value calculation does not change, staying at 0x0400. As a result, the advertised rank for the particular network node does not increase from the first determination to the subsequent determination, and routes using the particular network node as a preferred parent network node are not poisoned. Otherwise, using the standard MRHOF, the advertised rank for the particular network node increases from the first determination (0x0336) to the subsequent determination (0x0337), and routes using the particular network node as a preferred parent network node may be poisoned.

In Example 2, the particular network node has two candidate parent network nodes (P1 and P2), with P1 being the preferred parent network node. For the standard MRHOF, Item 2 is calculated only for the parent network node with the highest rank. The first Rank value calculation for the particular network node results in an advertised Rank value of 0x0400.

Example 2

| Parent List | | | Rank via | Standard MRHOF | MRHOF modified |
|---|---|---|---|---|---|
| | | | | Rank Rounded to the next | Rank of preferred parent rounded to the second next |
| Parent | Rank (advertised) | ETX (to parent) | preferred parent | Higher integral rank. | Higher integral rank |
| P1 | 0x020A | 0x00C8 (<0x0100) | 0x030A | N/A | 0x0400 |
| P2 | 0x020C | 0x00FA | N/A | 0x0300 | N/A |

For the subsequent Rank value calculation, the ETX to the preferred parent network node P1 increases from 0x00C8 to 0x00B.

| P1 | 0x020A | 0x010B | 0x0315 | N/A | 0x0400 |
|---|---|---|---|---|---|
| P2 | 0x020C | 0x00FA | N/A | 0x0300 | N/A |

Similar to Example 1, using the MRHOF as modified, the result of the subsequent Rank value calculation does not change from 0x0400. As a result, like with Example 1, the advertised rank for the particular network node does not increase from the first determination to the subsequent determination, and routes using the particular network node as a preferred parent network node are not poisoned. Otherwise, using the standard MRHOF, the advertised rank for the particular network node increases from the first determination (0x030A) to the subsequent determination (0x0315).

Figure 4:
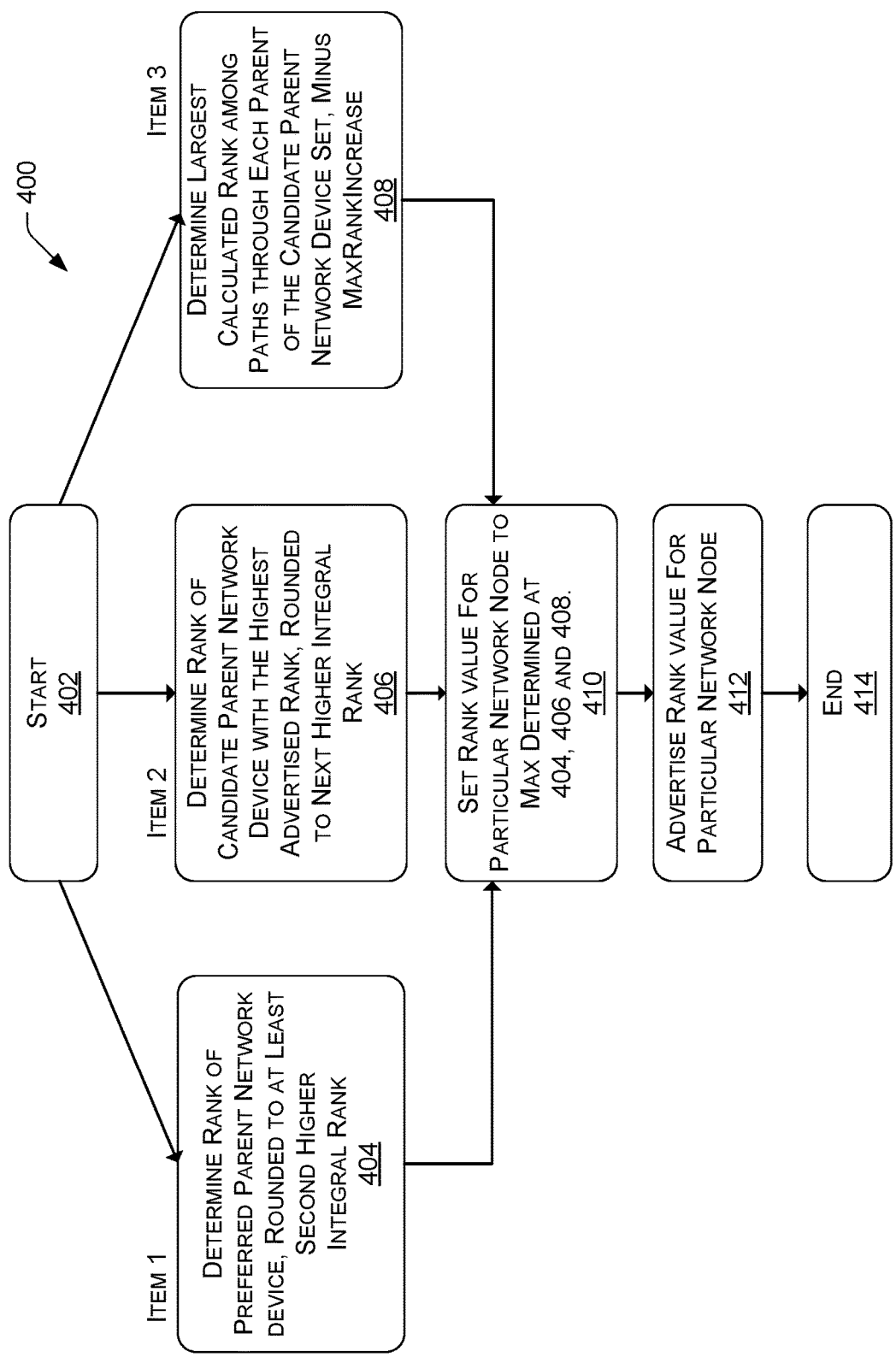
FIG. 4 illustrates an example process for determining the Rank value to be advertised by a particular network node.

FIG. 4 illustrates an example process 400 for employing techniques discussed herein. For ease of illustration the process 400 may be described as being performed by a device described herein, such as the network communication device 200 and/or the service provider 110. However, the process 400 may be performed by other devices. Moreover, the devices may be used to perform other processes.

The process 400 (as well as each process described herein) is illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Referring to FIG. 4, the example process 400 is for determining the Rank value to be advertised by a particular network node, such as the particular network node 302 in the FIG. 3 network 300. The particular network node has a preferred parent network node and at least one candidate parent network node. The process starts at 402. At each of 404, 406 and 408, a tentative Rank value is determined for the particular network node. In the FIG. 4 process, the particular network node carries out the operations 404, 406 and 408 in parallel. In some examples, the operations 404, 406 and 408 may be carried out in series, or in some combination of in series and in parallel.

At 404, the first tentative Rank value is determined by determining the Rank value for the preferred parent network node, rounded to at least the second higher integral Rank. As discussed above, rounding to the second higher integral Rank is an example, and other amounts of rounding up (for example, beyond the second higher integral Rank) are possible. The operation at 404 may, for example, be as described above as the modified Item 1 of the Rank determination MRHOF processing.

At 406, the Rank of the candidate parent network node having the highest Rank is determined, rounded to the next higher integral Rank. For example, referring to the FIG. 3 network 300, the candidate parent network node having the highest Rank may be one of the candidate parent network nodes in the subset 304 of network nodes. The operation at 406 may, for example, be as described above as Item 2 of the Rank determination MRHOF processing.

At 408, the largest calculated Rank among paths through each parent of the candidate parent network device set is determined, minus the MaxRankIncrease parameter value. The paths are from the particular network node, through each parent of the candidate parent network device set, to a destination node. The MaxRankIncrease parameter value may be zero or some non-zero value. The operation at 408 may, for example, be as described above at Item 3 of the Rank determination MRHOF processing.

At 410, the Rank value for the particular network node is set to the maximum of the Rank values determined at 404, 406 and 408. At 412, the Rank value set for the particular network node at 410 is advertised, such as to children network nodes of the particular network node. For example, referring to the FIG. 3 network 300, the children network nodes of the particular network node 302 may be the network node 312, the network node 314, the network node 316 and the network node 318. At 414, the process 400 ends.

Figure 5:
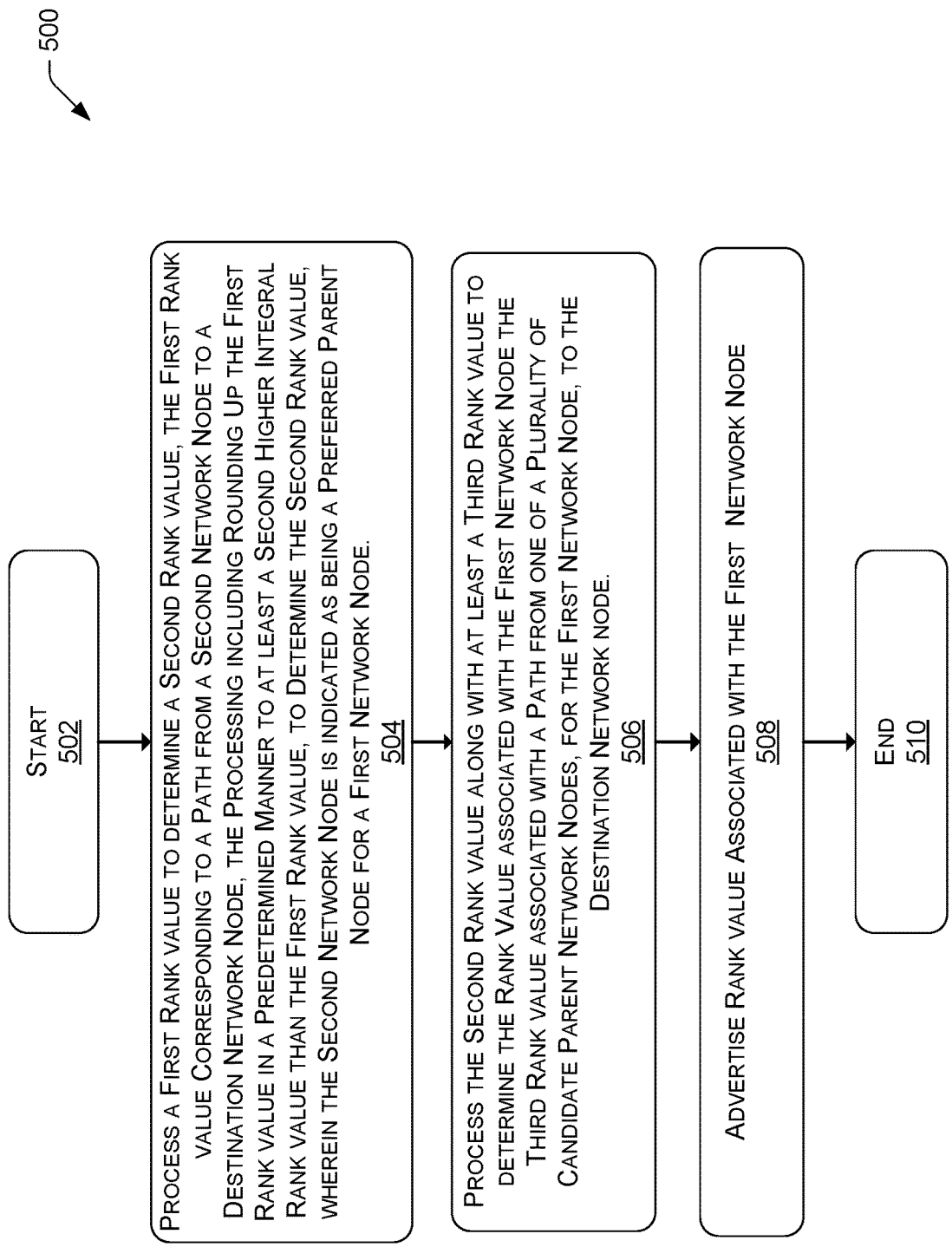
FIG. 5 illustrates a second example process for determining the Rank value to be advertised by a particular network node.

Referring to FIG. 5, a second example process 500 is for determining the Rank value to be advertised by a particular network node (a "first network node"), such as the particular network node 302 in the FIG. 3 network 300. The particular network node has a preferred parent network node and at least one candidate parent network node. The process starts at 502.

At 504, a first Rank value is processed to determine a second Rank value. The first Rank value corresponds to a path from a second network node to a destination network node, where the second network node is the preferred parent network node for the first network node. The processing includes rounding up the first Rank value in a predetermined manner to at least a second next higher integral Rank value than the first Rank value, to determine the second Rank value. The operation 504 may correspond to the operation 404 in the FIG. 4 process 400, in some examples.

At 506, the second Rank value is processed along with at least a third Rank value to determine the Rank value associated with the first network node. The third Rank value is associated with a path from one of a plurality of candidate parent network nodes, for the first network node, to the destination network node. For example, the third Rank value may be determined by processing a fourth Rank value, corresponding to the path from the one of the plurality of candidate parent network nodes, where the processing includes rounding up the fourth Rank value to a next higher integral Rank value. For example, the fourth Rank value may be a highest Rank value of Rank values associated with each of the plurality of candidate parent network nodes. The operation 506 may correspond to the operation 406 in the FIG. 4 process 400, in some examples.

At 508, the Rank value associated with the first network node is advertised, such as to neighbor nodes of the first network node. At 510, the process 500 ends.

With the processes 400 and 500, network instability may be minimized, such as due to fewer changes to the advertised Rank value for a particular network node. For example, this may contribute to minimizing poisoning routes to children network nodes of the particular network node, which may minimize overhead that would otherwise be utilized to reestablish poisoned routes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to determine a rank value associated with a first network node, the rank value tolerant to increases in a link cost between the first network node and its preferred parent network node with respect to routing, the method comprising:
  rounding up a first rank value in a predetermined manner to at least two integral rank values higher than the first rank value, wherein the first rank value corresponds to a path from a second network node to a destination network node and the second network node is indicated as being a preferred parent node for the first network node;
  determining a second rank value based at least in part on the rounded-up first rank value;
  determining the rank value associated with the first network node based at least in part on the second rank value along with at least a third rank value, the third rank value associated with a path from one of a plurality of candidate parent network nodes, for the first network node, to the destination network node; and
  advertising the rank value associated with the first network node to neighbor nodes of the first network node.

2. The method of claim 1, wherein:
the one of the plurality of candidate parent network nodes has a highest rank value of a rank value associated with each other of the plurality of candidate parent network nodes.

3. The method of claim 1, further comprising:
determining the third rank value by rounding up a fourth rank value to a next higher integral rank value, the fourth rank value corresponding to the path from the one of the plurality of candidate parent network nodes.

4. The method of claim 3, wherein:
the fourth rank value is a highest rank value of rank values associated with each of the plurality of candidate parent network nodes.

5. The method of claim 3, wherein:
the fourth rank value corresponds to at least one metric value for the path from the one of the plurality of candidate parent network nodes, for the first network node, to the destination network node.

6. The method of claim 5, wherein:
the at least one metric value comprises an Expected Transmission Count (ETX) value.

7. The method of claim 1, wherein:
the second rank value corresponds to at least one metric value for the path from the second network node to the destination network node.

8. The method of claim 7, wherein:
the at least one metric value comprises an Expected Transmission Count (ETX) value.

9. A network communication device, comprising:
one or more processors; and
memory coupled to the one or more processors, the memory storing instructions executable by the one or more processors to perform operations to determine a rank value associated with a first network node, the rank value tolerant to increases in a link cost between the first network node and its preferred parent network node with respect to routing, the operations including:
  rounding up a first rank value in a predetermined manner to at least two integral rank values higher than the first rank value, wherein the first rank value corresponds to a path from a second network node to a destination network node and the second network node is indicated as being a preferred parent node for the first network node;
  determining a second rank value based at least in part on the rounded-up first rank value;
  determining the rank value associated with the first network node based at least in part on the second rank value along with at least a third rank value, the third rank value associated with a path from one of a plurality of candidate parent network nodes, for the first network node, to the destination network node; and
  advertising the rank value associated with the first network node to neighbor nodes of the first network node.

10. The network communication device of claim 9, wherein:
the one of the plurality of candidate parent network nodes has a highest rank value of a rank value associated with each other of the plurality of candidate parent network nodes.

11. The network communication device of claim 9, the operations further comprising:
determining the third rank value by rounding up a fourth rank value to a next higher integral rank value, the fourth rank value corresponding to the path from the one of the plurality of candidate parent network nodes.

12. The network communication device of claim 11, wherein:
the fourth rank value is a highest rank value of rank values associated with each of the plurality of candidate parent network nodes.

13. The network communication device of claim 11, wherein:
the fourth rank value corresponds to at least one metric value for the path from the one of the plurality of candidate parent network nodes, for the first network node, to the destination network node.

14. The network communication device of claim 9, wherein:
the second rank value corresponds to at least one metric value for the path from the second network node to the destination network node.

15. One or more computer-readable media storing instructions that, when executed by one or more processors of a node, configure the node to perform operations to determine a rank value associated with a first network node, the rank value tolerant to increases in a link cost between the first network node and its preferred parent network node with respect to routing, the operations comprising:
rounding up a first rank value in a predetermined manner to at least two integral rank values higher than the first rank value, wherein the first rank value corresponds to a path from a second network node to a destination network node and the second network node is indicated as being a preferred parent node for the first network node;
determining a second rank value based at least in part on the rounded-up first rank value;
determining the rank value associated with the first network node based at least in part on the second rank value along with at least a third rank value, the third rank value associated with a path from one of a plurality of candidate parent network nodes, for the first network node, to the destination network node; and
advertising the rank value associated with the first network node to neighbor nodes of the first network node.

16. The one or more computer-readable media of claim 15, wherein:
the one of the plurality of candidate parent network nodes has a highest rank value of a rank value associated with each other of the plurality of candidate parent network nodes.

17. The one or more computer-readable media of claim 15, the operations further comprising:
determining the third rank value by rounding up a fourth rank value to a next higher integral rank value, the fourth rank value corresponding to the path from the one of the plurality of candidate parent network nodes.

18. The one or more computer-readable media of claim 17, wherein:
the fourth rank value is a highest rank value of rank values associated with each of the plurality of candidate parent network nodes.

19. The one or more computer-readable media of claim 17, wherein:
the fourth rank value corresponds to at least one metric value for the path from the one of the plurality of candidate parent network nodes, for the first network node, to the destination network node.

20. The one or more computer-readable media of claim 15, wherein:
the second rank value corresponds to at least one metric value for the path from the second network node to the destination network node.

* * * * *